(12) United States Patent
Hwang

(10) Patent No.: US 11,987,092 B2
(45) Date of Patent: May 21, 2024

(54) VEHICLE INTEGRATED CONTROL METHOD AND SYSTEM

(71) Applicants: Hyundai Motor Company, Seoul (KR); Kia Motors Corporation, Seoul (KR)

(72) Inventor: Sung Wook Hwang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 923 days.

(21) Appl. No.: 16/887,174

(22) Filed: May 29, 2020

(65) Prior Publication Data

US 2021/0162832 A1 Jun. 3, 2021

(30) Foreign Application Priority Data

Nov. 28, 2019 (KR) .................. 10-2019-0156017

(51) Int. Cl.
*B60G 17/06* (2006.01)

(52) U.S. Cl.
CPC .......... *B60G 17/06* (2013.01); *B60G 2204/81* (2013.01); *B60G 2400/252* (2013.01); *B60G 2400/821* (2013.01); *B60G 2400/823* (2013.01); *B60G 2400/91* (2013.01); *B60G 2401/27* (2013.01); *B60G 2500/10* (2013.01); *B60G 2800/912* (2013.01)

(58) Field of Classification Search
CPC ............... B60G 17/06; B60G 2204/81; B60G 2400/252; B60G 2400/821; B60G 2400/823; B60G 2400/91; B60G 2401/27; B60G 2500/10; B60G 2800/912
See application file for complete search history.

(56) References Cited

U.S. PATENT DOCUMENTS

| 5,103,396 A | * | 4/1992 | Hiwatashi | ............ B60G 17/018 280/DIG. 1 |
| 5,488,556 A | | 1/1996 | Sasaki | |
| 6,285,935 B1 | | 9/2001 | Murata | |

(Continued)

FOREIGN PATENT DOCUMENTS

| CN | 101848819 A | 9/2010 |
| CN | 102079228 A | 6/2011 |

(Continued)

OTHER PUBLICATIONS

Farong, K., et al., "Research on adjustable damping switching control of a hybrid active suspension," China Science Paper, vol. 13, No. 16, Aug. 2018, 7 pages.

(Continued)

*Primary Examiner* — Todd Melton
*Assistant Examiner* — Michelle D Warren
(74) *Attorney, Agent, or Firm* — Slater Matsil, LLP

(57) ABSTRACT

A vehicle integrated control method includes determining a road surface status, determining a vehicle status, determining an integrated control mode by determining a control status of an electronic control suspension and a motion of a sprung mass and an unsprung mass based on the determination results of the road surface status and the vehicle status, and controlling the electronic control suspension and an in-wheel system by determining a control amount based on the determined integrated control mode.

20 Claims, 9 Drawing Sheets

(56) References Cited

U.S. PATENT DOCUMENTS

| | | | |
|---|---|---|---|
| 9,114,683 B2* | 8/2015 | Kikuchi | B60G 17/0195 |
| 9,428,184 B2 | 8/2016 | Kikuchi et al. | |
| 10,106,009 B2 | 10/2018 | Hirao et al. | |
| 10,300,760 B1 | 5/2019 | Aikin et al. | |
| 10,449,822 B2 | 10/2019 | Furuta | |
| 11,370,414 B2 | 6/2022 | Takei | |
| 2009/0121444 A1 | 5/2009 | Bushko et al. | |
| 2009/0138157 A1 | 5/2009 | Hagglund et al. | |
| 2011/0127127 A1 | 6/2011 | Hirao et al. | |
| 2014/0005888 A1 | 1/2014 | Bose et al. | |
| 2014/0358373 A1* | 12/2014 | Kikuchi | B60G 17/0185 |
| | | | 701/38 |
| 2015/0006031 A1 | 1/2015 | Kikuchi et al. | |
| 2015/0046035 A1 | 2/2015 | Kikuchi et al. | |
| 2016/0107499 A1 | 4/2016 | Cho | |
| 2017/0320363 A1 | 11/2017 | Hung | |
| 2019/0176811 A1 | 6/2019 | Cho et al. | |
| 2019/0283733 A1* | 9/2019 | Takei | B60G 17/0195 |
| 2020/0391559 A1 | 12/2020 | Suzuki et al. | |
| 2022/0176766 A1* | 6/2022 | Kikuchi | B60G 17/08 |

FOREIGN PATENT DOCUMENTS

| | | |
|---|---|---|
| CN | 103434359 A | 12/2013 |
| CN | 104024076 A | 9/2014 |
| CN | 104080671 A | 10/2014 |
| CN | 104203609 A | 12/2014 |
| CN | 105774458 A | 7/2016 |
| CN | 109203903 A | 1/2019 |
| CN | 110281723 A | 9/2019 |
| DE | 102009013357 A1 | 9/2010 |
| JP | H06179316 A | 6/1994 |
| JP | H1111131 A | 1/1999 |
| JP | 2005255152 A | 9/2005 |
| JP | 2009214762 A | 9/2009 |
| JP | 2010058704 A | 3/2010 |
| JP | 2013189154 A | 9/2013 |
| KR | 19990020673 A | 3/1999 |
| KR | 20100045780 A | 5/2010 |
| TH | 152966 A | 6/2016 |

OTHER PUBLICATIONS

Shipeng, B., et al., "Applicability of vehicle vertical vibration energy harvesting using unsprung tuned mass dampers," Journal of Tsinghua University (Science & Technology), vol. 58, No. 11, Nov. 15, 2018, 8 pages.

Zhao, F., "Control Strategy of Intelligent Vehicle Suspension System Based on the Perception of the Road," China Master's Theses Full-text Database Engineering Technology II, No. 06, Jun. 15, 2018, 150 pages.

China National Intellectual Property Administration, PRC, "Notification of the First Office Action," Chinese Application No. 2020105605379, dated Sep. 9, 2023, 25 pages.

* cited by examiner

| INTEGRATED CONTROL MODE | MOTIONS OF SPRUNG AND UNSPRUNG MASSES | ECS CONTROL | DETERMINATION OF DIRECTIONS AND SIZES OF IN-WHEEL VERTICAL COMPONENT OF FORCE Fc |
|---|---|---|---|
| 1 | SPRUNG ↑ UNSPRUNG ↑ | ONLY BASIC DAMPING FORCE (SECOND QUADRANT: WEAK COMPRESSION) | FRONT-WHEEL IN-WHEEL: DRIVEN, REAR-WHEEL IN-WHEEL: BRAKED/Fc($\downarrow$) = $c_{sky} \cdot abs(\dot{x}_s)$ |
| 2 | SPRUNG ↑ UNSPRUNG ↓ | BASIC DAMPING FORCE+SKY HOOK DAMPING FORCE (FIRST QUADRANT: STRONG TENSION) | FRONT-WHEEL IN-WHEEL: DRIVEN, REAR-WHEEL IN-WHEEL: BRAKED/Fc($\downarrow$) = $(c^* \pm c_{ad}) \cdot abs(\dot{x}_s - \dot{x}_u)$ |
| 3 | SPRUNG ↓ UNSPRUNG ↓ | ONLY BASIC DAMPING FORCE (FOURTH QUADRANT: WEAK TENSION) | FRONT-WHEEL IN-WHEEL: BRAKED, REAR-WHEEL IN-WHEEL: DRIVEN/Fc($\uparrow$) = $c_{sky} \cdot abs(\dot{x}_s)$ |
| 4 | SPRUNG ↓ UNSPRUNG ↑ | BASIC DAMPING FORCE + SKYHOOK DAMPING FORCE (THIRD QUADRANT: STRONG COMPRESSION) | FRONT-WHEEL IN-WHEEL: BRAKED, REAR-WHEEL IN-WHEEL: DRIVEN/Fc($\uparrow$) = $(c^* \pm c_{ad}) \cdot abs(\dot{x}_s - \dot{x}_u)$ |

FIG. 7

VEHICLE INTEGRATED CONTROL METHOD AND SYSTEM

CROSS-REFERENCE TO RELATED APPLICATIONS

This application claims priority to Korean Patent Application No. 10-2019-0156017, filed in the Korean Intellectual Property Office on Nov. 28, 2019, which application is hereby incorporated herein by reference.

TECHNICAL FIELD

The present disclosure relates to vehicle integrated control.

BACKGROUND

A suspension of a vehicle is an important part of the vehicle as a main apparatus for determining riding quality and traveling stability. In general, a suspension with a low damping force is required to improve the riding quality. However, in this case, the riding quality is excellent, but the traveling stability is reduced because of a severe stability change of a pitch, a roll, a heave, and the like in a case of sudden acceleration, sudden braking, sudden turning, and the like.

On the other hand, in a case of a suspension with a high damping force, the change in the stability of the vehicle occurred in various driving situations may be suppressed through ride holding, thereby improving the traveling stability. However, a vibration of a road surface is not absorbed and transmitted directly to a vehicle body, so that the riding qualities of a driver and a passenger are deteriorated. For this reason, it is difficult to develop a vehicle suspension that satisfies both the riding quality and the traveling stability.

In general, a force for moving the vehicle comes from an engine, and in a case of an eco-friendly electric-powered vehicle, from a drive motor. A driving force generated while the engine disposed in the vehicle rotates is transmitted to wheels of the vehicle through a power transmission device such as a torque converter, a transmission, and a drive shaft.

An in-wheel system, which has recently attracted attention to be installed in a future vehicle, is a system that independently controls braking forces/driving forces of four wheels of the vehicle by embedding motors respectively in the wheels and driving the motors in a distributed manner.

The in-wheel system has advantages of reducing a weight of the vehicle body and improving a fuel efficiency by minimizing use of parts as well as having less power loss because the motors mounted in the wheels respectively and directly drive the wheels without several power systems.

The in-wheel system may expect great synergy when coupled with safety devices of the vehicle. For example, the in-wheel system may be coupled with an electronic stability control (ESC), which is a vehicle stability control device, to greatly improve a turning angle at which the vehicle may be adjusted as the driver intends on a curved road.

In addition, the in-wheel system is able to create a flat interior space, so that a much more free vehicle design may be available.

The in-wheel system is expected to be applied to a shared service vehicle, a shuttle bus of a hospital, a delivery vehicle, a shared office vehicle, and the like.

Research for providing a better riding quality to the driver by controlling the in-wheel system having many advantages in conjunction with an existing vehicle system is required.

SUMMARY

The present disclosure relates to vehicle integrated control. Particular embodiments relate to a technology for integrally controlling an in-wheel system and an ECS to improve riding quality in a vehicle equipped with the in-wheel system and the electronic control suspension (ECS). Embodiments of the present disclosure have been made to solve problems occurring in the prior art while advantages achieved by the prior art are maintained intact.

An embodiment of the present disclosure provides a vehicle integrated control method and system capable of improving a riding quality through integrated control of an in-wheel system and an electronic control suspension (ECS).

Another embodiment of the present disclosure provides a vehicle integrated control method and system that independently control a braking force and a driving force of an in-wheel system to apply a vertical component of force of a vehicle body, so that a damping force of a vehicle with a semi active suspension is actively controlled like that of a vehicle with a full active suspension, thereby optimizing a riding quality.

Another embodiment of the present disclosure provides a vehicle integrated control method and system capable of satisfying a riding quality without changing an ESC capacity due to vehicle weight increase.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, a vehicle integrated control method includes determining a road surface status, determining a vehicle status, determining an integrated control mode by determining a control status of an electronic control suspension and a motion of a sprung/unsprung mass based on the determination results of the road surface status and the vehicle status, and controlling the electronic control suspension and an in-wheel system by determining a control amount based on the determined integrated control mode.

In one embodiment, the vehicle status may be determined when the road surface status is an irregular road surface including a bump and a pothole.

In one embodiment, the determining of the vehicle status may include determining whether a turning characteristic and a straightness are within a predetermined allowable range, wherein the control status of the electronic control suspension and the motion of the sprung/unsprung mass may be determined when the turning characteristic and the straightness are within the predetermined allowable range.

In one embodiment, the determining of the integrated control mode may include determining the integrated control mode as a first mode when both the sprung mass and the unsprung mass ascend based on ascending of a vehicle body and compression of a spring, determining the integrated control mode as a second mode when the sprung mass ascends and the unsprung mass descends based on the ascending of the vehicle body and tension of the spring, determining the integrated control mode as a third mode when both the sprung mass and the unsprung mass descend based on descending of the vehicle body and the tension of the spring, and determining the integrated control mode as a fourth mode when the sprung mass descends and the unsprung mass ascends based on the descending of the vehicle body and the compression of the spring.

In one embodiment, a basic damping force of the electronic control suspension and a vertical component of force of the in-wheel system may be controlled in the first mode and the third mode.

In one embodiment, a direction and a magnitude of the vertical component of force may be controlled based on a braking/driving force of a front/rear-wheel in-wheel, wherein the front-wheel in-wheel may be driven and the rear-wheel in-wheel may be braked in the first mode to control the vertical component of force in a downward direction, and wherein the front-wheel in-wheel may be braked and the rear-wheel in-wheel may be driven in the third mode to control the vertical component of force in an upward direction.

In one embodiment, a basic damping force and a sky hook damping force of the electronic control suspension may be controlled and a vertical component of force of the in-wheel system may be controlled in the second mode and the fourth mode.

In one embodiment, a direction and a magnitude of the vertical component of force may be controlled based on a braking/driving force of a front/rear-wheel in-wheel, wherein the front-wheel in-wheel may be driven and the rear-wheel in-wheel may be braked in the second mode to control the vertical component of force in a downward direction, and wherein the front-wheel in-wheel may be braked and the rear-wheel in-wheel may be driven in the fourth mode to control the vertical component of force in an upward direction.

In one embodiment, the vertical component of force may be controlled by applying an adjusted damping coefficient in a region where a damping coefficient is equal to or below, or equal to or above, a certain damping coefficient in the second mode or the fourth mode.

In one embodiment, the road surface status may be determined using a G-value level and a vibration frequency based on sensing values measured by a vehicle body gravity sensor and a wheel gravity sensor.

According to an embodiment of the present disclosure, a vehicle integrated control system for improving a riding quality using an electronic control suspension and an in-wheel system includes a road surface status determination module for determining a road surface status, a vehicle status determination module for determining a vehicle status, an integrated control mode determination module for determining an integrated control mode by determining a control status of the electronic control suspension and a motion of a sprung/unsprung mass based on the determination results of the road surface status and the vehicle status, a control amount determination module for determining a control amount based on the determined integrated control mode, a first control module for controlling the electronic control suspension based on the determined control amount, and a second control module for controlling the in-wheel system based on the determined control amount.

In one embodiment, the vehicle status determination module may determine the vehicle status when the road surface status is an irregular road surface including a bump and a pothole.

In one embodiment, the vehicle status determination module may determine whether a turning characteristic and a straightness are within a predetermined allowable range, and determine the control status of the electronic control suspension and the motion of the sprung/unsprung mass when the turning characteristic and the straightness are within the predetermined allowable range.

In one embodiment, the integrated control mode determination module may include means for determining the integrated control mode as a first mode when both the sprung mass and the unsprung mass ascend based on the ascending of a vehicle body and compression of a spring, means for determining the integrated control mode as a second mode when the sprung mass ascends and the unsprung mass descends based on the ascending of the vehicle body and tension of the spring, means for determining the integrated control mode as a third mode when both the sprung mass and the unsprung mass descend based on the descending of the vehicle body and the tension of the spring, and means for determining the integrated control mode as a fourth mode when the sprung mass descends and the unsprung mass ascends based on the descending of the vehicle body and the compression of the spring.

In one embodiment, a basic damping force of the electronic control suspension and a vertical component of force of the in-wheel system may be controlled in the first mode and the third mode.

In one embodiment, a direction and a magnitude of the vertical component of force may be controlled based on a braking/driving force of a front/rear-wheel in-wheel, wherein the second control module may drive the front-wheel in-wheel and brake the rear-wheel in-wheel in the first mode to control the vertical component of force in a downward direction, and brake the front-wheel in-wheel and drive the rear-wheel in-wheel in the third mode to control the vertical component of force in an upward direction.

In one embodiment, a basic damping force and a sky hook damping force of the electronic control suspension may be controlled and a vertical component of force of the in-wheel system may be controlled in the second mode and the fourth mode.

In one embodiment, a direction and a magnitude of the vertical component of force may be controlled based on a braking/driving force of a front/rear-wheel in-wheel, wherein the second control module may drive the front-wheel in-wheel and brake the rear-wheel in-wheel in the second mode to control the vertical component of force in a downward direction, and brake the front-wheel in-wheel and drive the rear-wheel in-wheel in the fourth mode to control the vertical component of force in an upward direction.

In one embodiment, the vertical component of force may be controlled by applying an adjusted damping coefficient in a region where a damping coefficient is equal to or below, or equal to or above, a certain damping coefficient in the second mode or the fourth mode.

In one embodiment, the road surface status determination module may determine the road surface status using a G-value level and a vibration frequency based on sensing values measured by a vehicle body gravity sensor and a wheel gravity sensor.

The technical problems to be solved by the present inventive concept are not limited to the aforementioned problems, and any other technical problems not mentioned herein will be clearly understood from the following description by those skilled in the art to which the present disclosure pertains.

BRIEF DESCRIPTION OF THE DRAWINGS

The above and other objects, features and advantages of the present disclosure will be more apparent from the following detailed description taken in conjunction with the accompanying drawings, in which:

FIG. 7 is a table showing motions of sprung and unsprung masses, ECS control, and control of directions and magnitudes of an in-wheel vertical component of force based on an integrated control mode in a vehicle integrated control system according to one embodiment of the present disclosure;

DETAILED DESCRIPTION OF ILLUSTRATIVE EMBODIMENTS

Figure 1:
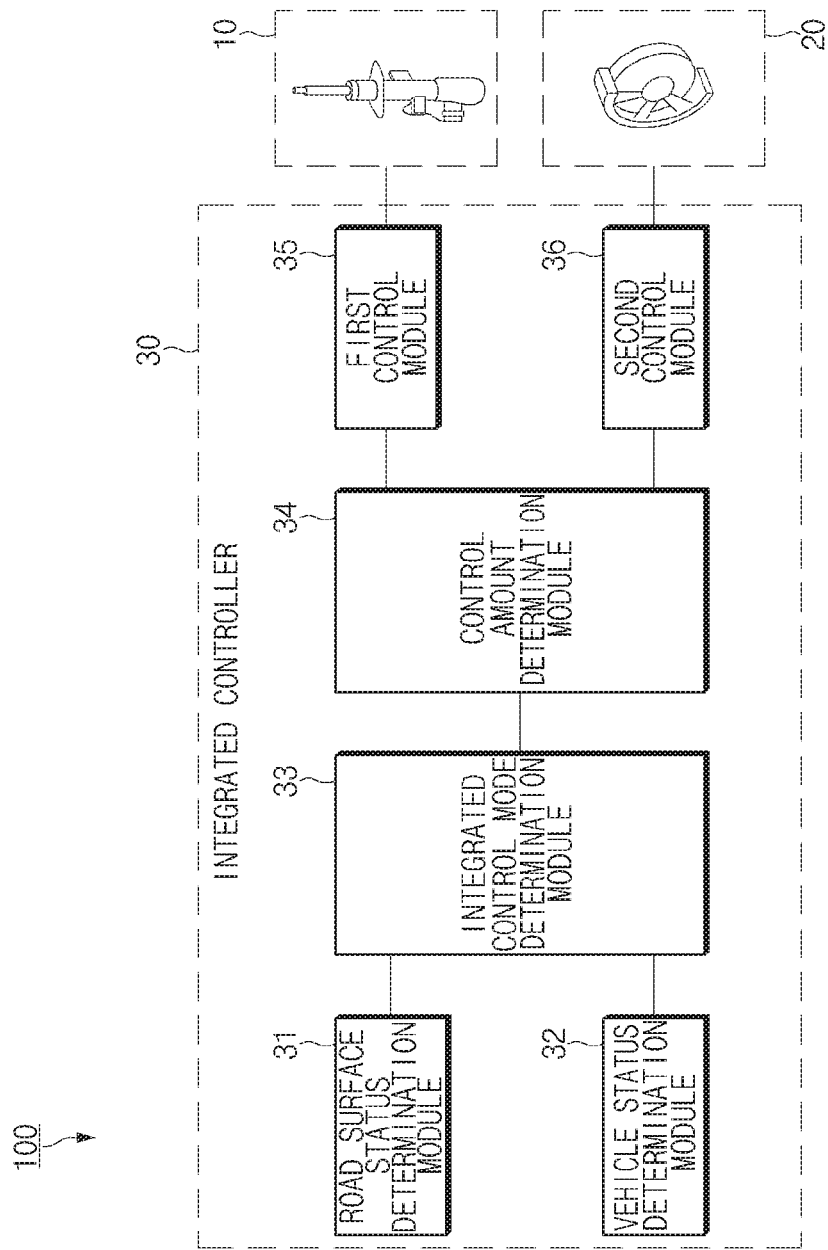
FIG. 1 is a view for describing a structure of a vehicle integrated control system according to one embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 9.

FIG. 1 is a view for describing a structure of a vehicle integrated control system according to one embodiment of the present disclosure.

Referring to FIG. 1, a vehicle integrated control system 100 may be largely composed of an electronic control suspension (ECS) 10, an in-wheel system 20, and an integrated controller 30.

The electronic control suspension (ECS) 10 is an electronic control system aimed at controlling stability of a vehicle body by varying a damping force of a shock absorber based on a traveling speed and a road condition, and thus simultaneously improving a riding quality and a traveling stability.

The ECS 10 may use a scheme of gradually adjusting the damping force of the shock absorber using a motor, a hydraulic device, and the like. Currently, the ECS 10 is only applied to expensive vehicles because of energy consumption, structural complexity, economic feasibility, and the like.

For example, the ECS 10 may improve vehicle protection and the riding quality by smoothing a suspension characteristic by increasing a vehicle height on an unpaved road, and improve the traveling stability by lowering the vehicle height to reduce air resistance and by strengthening the suspension characteristic on a highway.

The ECS 10 controls the riding quality of the vehicle using a body vertical acceleration sensor for detecting a vertical acceleration of the vehicle body and a wheel vertical acceleration sensor for detecting a vertical acceleration of a wheel, and controls handling of the vehicle using a damping force of the ECS 10 as much as possible when the vehicle turns.

Figure 2:
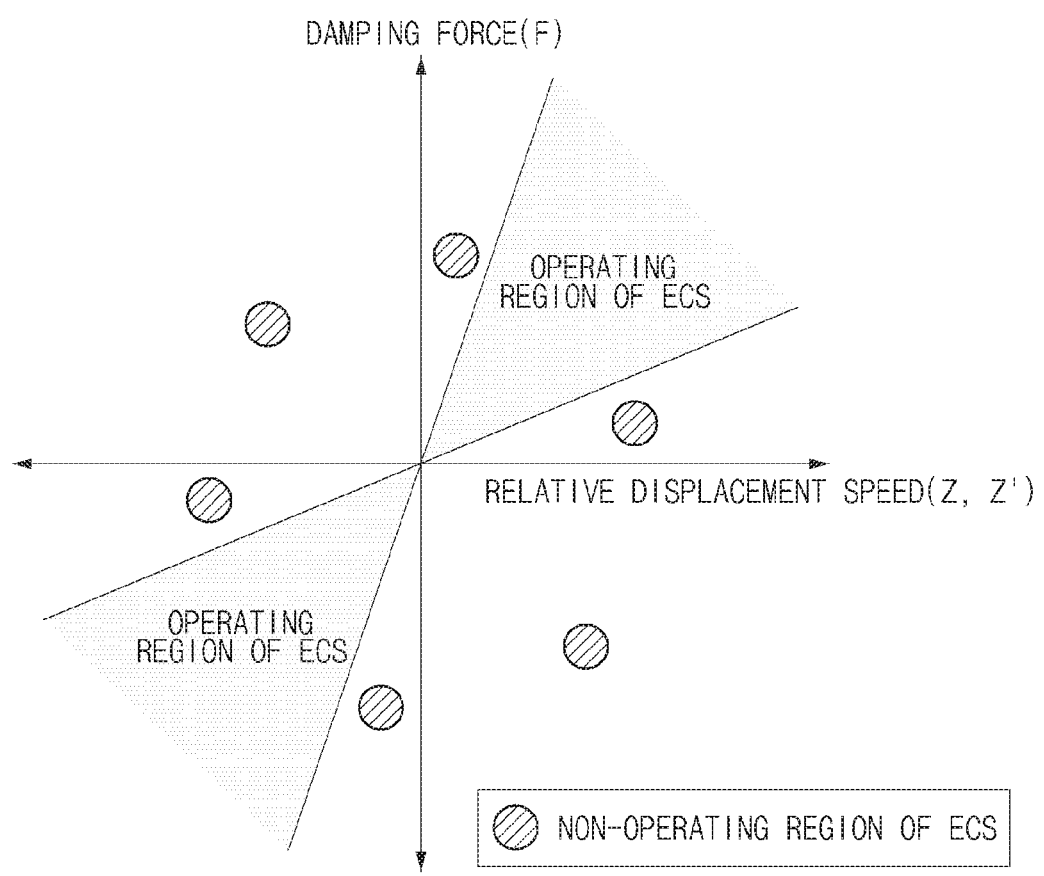
FIG. 2 illustrates an operating region and a non-operating region of an ECS according to an embodiment of the present embodiment.

The ECS 10 according to the embodiment may be a semi active suspension system that operates only when a specific condition is satisfied, as shown in FIG. 2 to be described later.

The in-wheel system 20 is a system capable of independently controlling braking forces/driving forces of four wheels of the vehicle by embedding motors respectively in the wheels and driving the motors in a distributed manner.

The in-wheel system 20 may control a turning angle by differently controlling torques of the motors respectively embedded in the wheels.

For example, when a rear-wheel drive vehicle makes a left turn, the in-wheel system 20 may be controlled such that a torque of a right rear-wheel motor has a larger value than a torque of a left rear-wheel motor.

The integrated controller 30 may adaptively control operations of the ECS 10 and the in-wheel system 20 to optimize the riding quality.

The integrated controller 30 according to the embodiment may improve the riding quality by controlling the in-wheel system 20 in a non-operating region of the ECS 10, and provide the optimal riding quality through coordinated control of the ECS 10 and the in-wheel system 20 in an operating region of the ECS 10.

The integrated controller 30 according to the embodiment may include a road surface status determination module 31, a vehicle status determination module 32, an integrated control mode determination module 33, a control amount determination module 34, a first control module 35, and a second control module 36.

The road surface status determination module 31 may determine a bump, a pothole, a road surface roughness, and the like based on sensing information sensed by various sensors arranged to sense a change in a vehicle body movement, a vehicle speed sensing signal, a camera-shot video, and the like.

As an example, the road surface status determination module 31 may determine a G value level and a vibration frequency based on sensing values measured by a vehicle body gravity sensor and a wheel gravity sensor.

In an embodiment, the gravity sensor may include an acceleration sensor that senses a change in speed of the vehicle body and a gyro sensor that senses a turning angle of the vehicle body but may not be limited thereto.

In an embodiment, the road surface status determination module 31 may determine a road surface status using a road surface status determination result value determined by a controller (not shown) of the ECS 10.

The vehicle status determination module 32 may calculate bounce, roll, pitch, and yaw values of the vehicle using the vehicle body gravity sensor, the wheel gravity sensor, a lateral acceleration sensor (or a lateral G sensor) that senses a lateral acceleration of the vehicle during traveling, a steering angle sensor that detects a rotation angle of a steering wheel, a vehicle speed sensor that detects the vehicle traveling speed, a yaw rate sensor that detects a rotational angular speed in a vertical axis direction, a tire pressure monitoring system (TPMS) that detects a tire pressure value, an acceleration/deceleration pedal sensor that detects acceleration and deceleration pedal pressure values, and the like.

In an embodiment, the vehicle status determination module 32 may determine a current status of the vehicle using a vehicle status determination result calculated by the controller (not shown) of the ECS 10.

The integrated control mode determination module 33 may determine an integrated control mode based on a correlation between a motion of a sprung mass and a motion of an unsprung mass when passing the road surface, such as the bump/pothole, and the vehicle status.

In general, a load applied to a suspension may be divided, on the basis of a spring, into the sprung mass (ms) supported by the spring and the unsprung mass (mu) supporting the spring.

When both the sprung mass and the unsprung mass ascend based on the ascending of the vehicle body and compression of the spring, the integrated control mode determination module 33 may determine the integrated control mode as a first mode.

When the sprung mass ascends and the unsprung mass descends based on the ascending of the vehicle body and tension of the spring, the integrated control mode determination module 33 may determine the integrated control mode as a second mode.

When both the sprung mass and the unsprung mass descend based on the descending of the vehicle body and the tension of the spring, the integrated control mode determination module 33 may determine the integrated control mode as a third mode.

When the sprung mass descends and the unsprung mass ascends based on the descending of the vehicle body and the compression of the spring, the integrated control mode determination module 33 may determine the integrated control mode as a fourth mode.

The integrated control mode determination module 33 may determine an overall damping force control scheme based on the determined integrated control mode.

Figure 3:
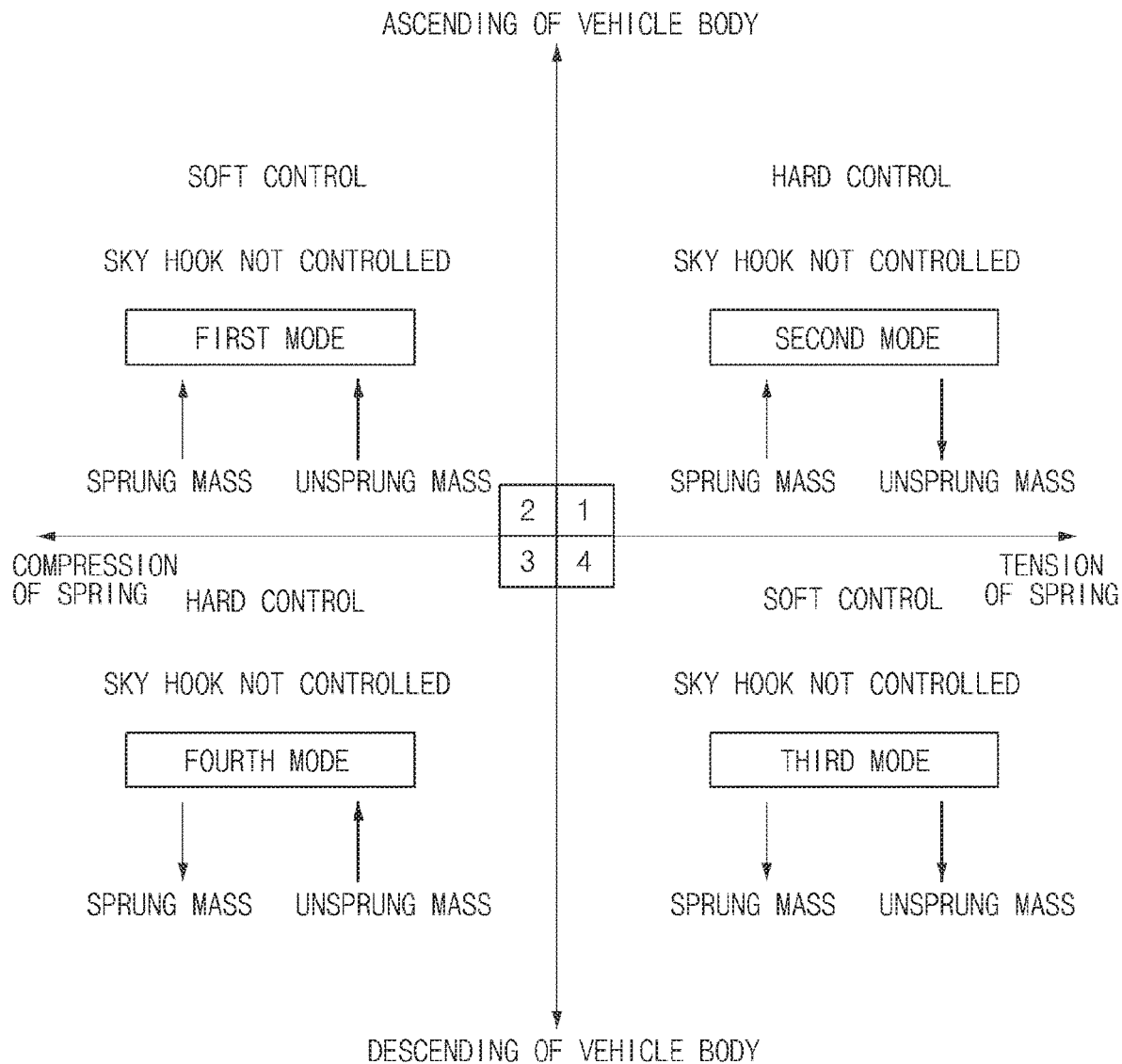
FIG. 3 is a view for describing a method for determining an integrated control mode according to one embodiment of the present disclosure.

For an example, as shown in FIG. 3 to be described later, when the determined integrated control mode is the second mode or the fourth mode, the integrated control mode determination module 33 may determine the damping force control scheme as hard control in an active control region. On the other hand, when the determined integrated control mode is the first mode or the third mode, the integrated control mode determination module 33 may determine the damping force control scheme as soft control in a manual control region.

In this connection, the hard control is a damping force control scheme that improves the riding quality by controlling a vertical component of force by the in-wheel system 20 in a direction for assisting the damping force of the ECS 10 to suppress the vehicle body motion in a region where an active damping force of the ECS 10 occurs.

On the other hand, the soft control is a damping force control scheme that improves the riding quality by controlling a vertical component of force Fc by the in-wheel system 20 to perform a role as a full active suspension in a region where the active damping force of the ECS 10 does not occur.

Therefore, the integrated controller 30 according to an embodiment of the present disclosure has an advantage of controlling the riding quality in all regions regardless of whether the damping force of the ECS 10 occurs.

The control amount determination module 34 may provide mathematical modeling for a suspension system in which the damping force of the ECS 10 and the vertical component of force of the in-wheel system 20 act in an integrated manner based on a control signal, for example, a flag signal of the integrated control mode determination module 33. In this connection, the flag signal may include information about the determined integrated control mode and damping force control scheme, but may not be limited thereto.

The control amount determination module 34 may maintain a control amount of the ECS 10 intact, and control a control amount of the in-wheel system 20, that is, a direction and a magnitude of the vertical component of force based on the flag signal to dynamically control an entirety of the damping force.

The first control module 35 may control the damping force of the ECS 10 based on a control signal of the control amount determination module 34.

The second control module 36 may dynamically control the vertical component of force of the in-wheel system 20 based on the control signal of the control amount determination module 34.

FIG. 2 illustrates an operating region and a non-operating region of an ECS according to the present embodiment.

Referring to FIG. 2, an operable region of the ECS 10 may be determined based on a relative displacement speed, that is, a change in the spring of the ECS 10, and the damping force.

The vehicle integrated control system wo according to the embodiment may improve the riding quality by controlling the vertical component of force of the in-wheel system 20 in the non-operating region of the ECS 10, and achieve the optimal riding quality through utilization, that is, cooperated control, of both the ECS 10 and the in-wheel system 20 in the operating region of the ECS 10.

Therefore, the embodiments of the present disclosure have an advantage of providing more improved riding quality in all traveling environments by solving a problem that control of the riding quality is possible only in a limited condition when only the existing ECS 10 is used.

FIG. 3 is a view for describing a method for determining an integrated control mode according to one embodiment of the present disclosure.

The integrated control mode may be determined based on a spring status of the ECS 10 and the vehicle status.

Referring to FIG. 3, when both the sprung mass and the unsprung mass ascend based on the ascending of the vehicle body and the compression of the spring, the integrated control mode determination module 33 may determine the integrated control mode as the first mode.

When the sprung mass ascends and the unsprung mass descends based on the ascending of the vehicle body and the tension of the spring, the integrated control mode determination module 33 may determine the integrated control mode as the second mode.

When both the sprung mass and the unsprung mass descend based on the descending of the vehicle body and the tension of the spring, the integrated control mode determination module 33 may determine the integrated control mode as the third mode.

When the sprung mass descends and the unsprung mass ascends based on the descending of the vehicle body and the compression of the spring, the integrated control mode determination module 33 may determine the integrated control mode as the fourth mode.

A sky hook phenomenon may occur in the second mode in which the spring is tensioned as the vehicle body ascends and in the fourth mode in which the spring is compressed as the vehicle body descends.

In this connection, the sky hook phenomenon may occur in a situation in which the vehicle body strongly ascends/descends when passing an uneven road surface because of the bump/pothole, and the like. Therefore, sky hook control may be achieved such that the vertical acceleration of the vehicle body is reduced.

In an integrated control mode in which the sky hook phenomenon occurs, that is, the second and fourth modes, the integrated control mode determination module 33 may determine the damping force control scheme as the hard control in the active control region. In this connection, the hard control may be a damping force control scheme of adjusting an entirety of the damping force through the cooperative control of the ECS 10 and the in-wheel system 20.

In an integrated control mode in which the sky hook phenomenon does not occur, that is, in the first and third modes, the integrated control mode determination module 33 may determine the damping force control scheme as the soft control in the manual control region. In this connection, the soft control may be a damping force control scheme of adjusting the entirety of the damping force by controlling only the vertical component of force of the in-wheel system 20.

The vehicle integrated control system wo according to embodiments of the present disclosure may precisely control the entirety of the damping force through the adaptive control of the ECS 10 and the in-wheel system 20 regardless of the road surface status and the vehicle status during the traveling, thereby providing the optimal riding quality.

Figure 4:
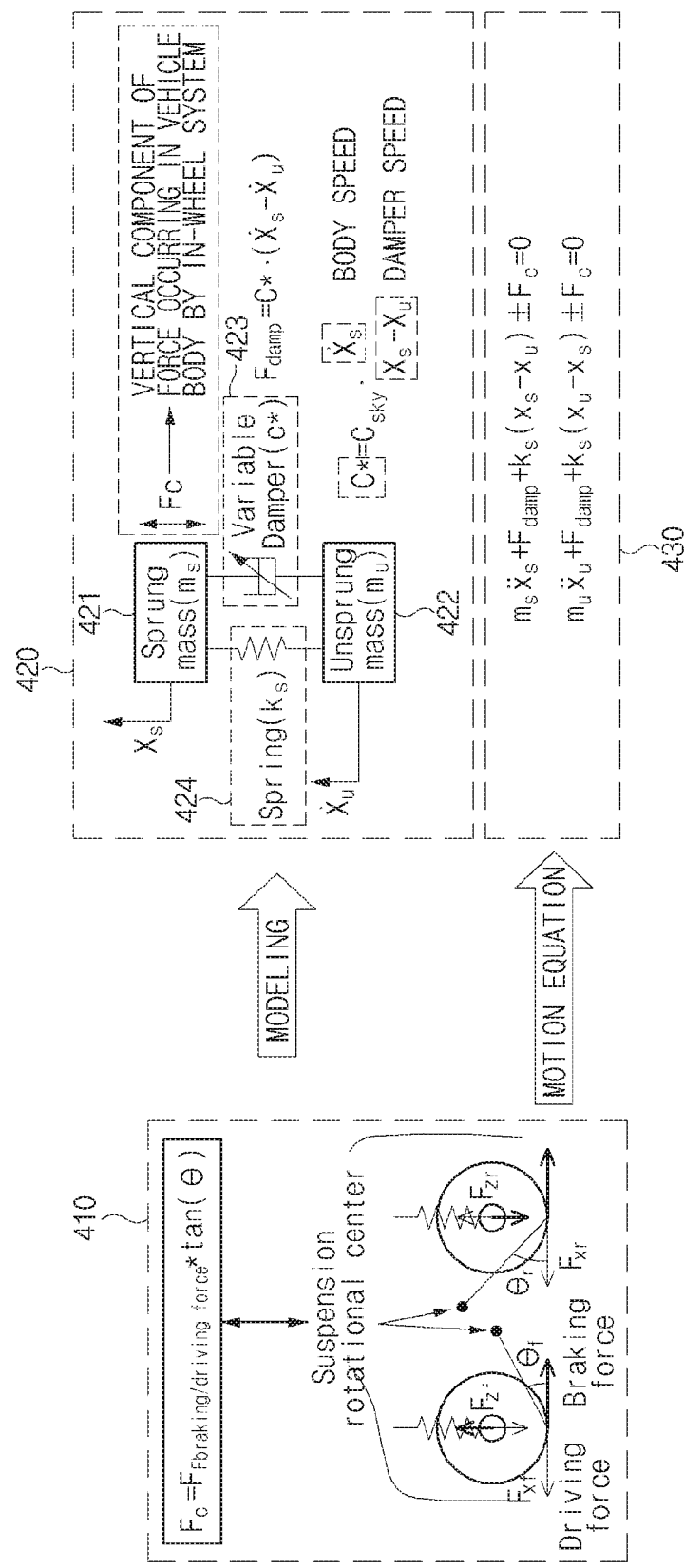
FIG. 4 is a view for describing a relationship between a braking/driving force and a vertical component of force.

FIG. 4 is a view for describing a relationship between a braking/driving force and a vertical component of force.

Referring to a reference numeral 410 in FIG. 4, the vertical component of force $F_{vertical\ component\ of\ force}$ of the in-wheel system 20 may be determined by an angle θ that a braking force or a driving force corresponding to front and rear wheels $F_{braking/driving\ force}$ and a corresponding suspension rotational center form with a corresponding braking force or driving force.

For example, the vertical component of force $F_{vertical\ component\ of\ force}$ may be determined by Equation 1 below.

$$F_{vertical\ component\ of\ force} = F_{braking/driving\ force} * \tan(\theta) \quad \text{<Equation 1>}$$

A reference numeral 420 illustrates a mathematical modeling of the vehicle integrated control system 100 for improving the riding quality according to embodiments of the present disclosure.

Referring to the reference numeral 420, the load applied to the suspension may be divided, on the basis of a spring 424, into a sprung mass (ms) 421 supported by the spring 424 and an unsprung mass (mu) 422 supporting the spring 424. A mass including a driving system including the vehicle body and a person corresponds to the sprung mass 421, and a damper, a control arm, a steering knuckle, a hub, a caliper, a disk, a tie rod, and the like of the suspension may belong to the unsprung mass 422.

The shock absorber may provide a function of absorbing an excess elastic energy of the spring and maintaining a grip force of a tire after absorbing a road surface shock, and may be implemented as a variable damper 423.

A reference numeral 430 is a motion equation corresponding to the mathematical model of the reference numeral 420. In this connection, ks included in the motion equation is a spring constant.

Figure 5:
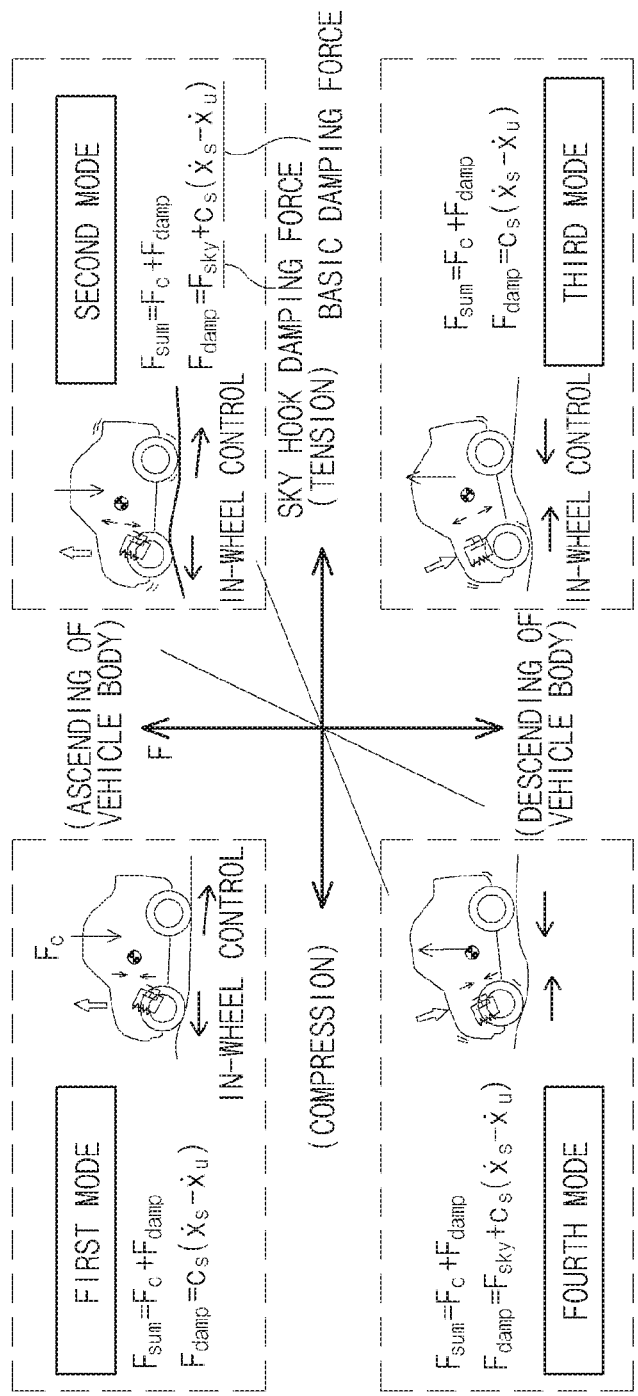
FIG. 5 is a view for describing a vehicle integrated control method for improving a riding quality according to one embodiment of the present disclosure.

FIG. 5 is a view for describing a vehicle integrated control method for improving a riding quality according to one embodiment of the present disclosure.

In general, because a damping force required for the shock absorber of the suspension varies depending on a traveling condition even at the same piston speed, a system for converting the damping force based on the traveling condition is adopted. In general, when traveling on a road with a good road surface, the damping force is set low to ensure the riding quality and the damping force is increased during sudden steering, sudden unintended acceleration, sudden braking, and the like, thereby reducing a variation in the stability of the vehicle body. In addition, when traveling on a rough road, a bad road, and the like, a vehicle body vibration may be rapidly suppressed by increasing the damping force, and a variation in the grip force of the tire may also be reduced.

Referring to FIGS. 3 and 5 described above, as shown in Equation 2 below, a total damping force $F_{SUM}$ in the vehicle integrated control system according to embodiments of the present disclosure may be determined by a sum of the vertical component of force $F_C$ by the in-wheel system 20 and a damping force $F_{damp}$ by the ECS 10.

$$F_{SUM} = F_C + F_{damp} \quad \text{<Equation 2>}$$

When the integrated control mode is the second mode or the fourth mode, as shown in Equation 3 below, the $F_{damp}$ may be determined by a sum of a sky hook damping force $F_{sky}$ and a basic damping force Cs(Xs−Xu).

$$F_{damp} = F_{sky} + Cs(Xs-Xu) \quad \text{<Equation 3>}$$

In this connection, Xs−Xu is a damper speed of the suspension, and Cs is a variable damper constant.

The Cs may be calculated by the sky hook constant Csky and a ratio of the body speed and the damper speed as shown in Equation 4 below.

$$C_{sky,i} = Xs/(Xs-Xu) \quad \text{<Equation 4>}$$

When the integrated control mode is the first mode or the third mode, the $F_{damp}$ may be the basic damping force Cs(Xs−Xu) in Equation 2.

In the first mode and third mode in which the active damping force of the ECS 10 occurs, the vertical component of force FC by the in-wheel system 20 acts in a direction for suppressing the vehicle body motion by assisting an existing damping force of the ECS 10.

In second and fourth quadrants where the active damping force of the ECS 10 does not occur, the vertical component of force FC by the in-wheel system 20 may serve as the full active suspension.

Therefore, the vehicle integrated control system 100 according to embodiments of the present disclosure has an advantage capable of controlling the riding quality in all of the first to fourth modes.

Figure 6:
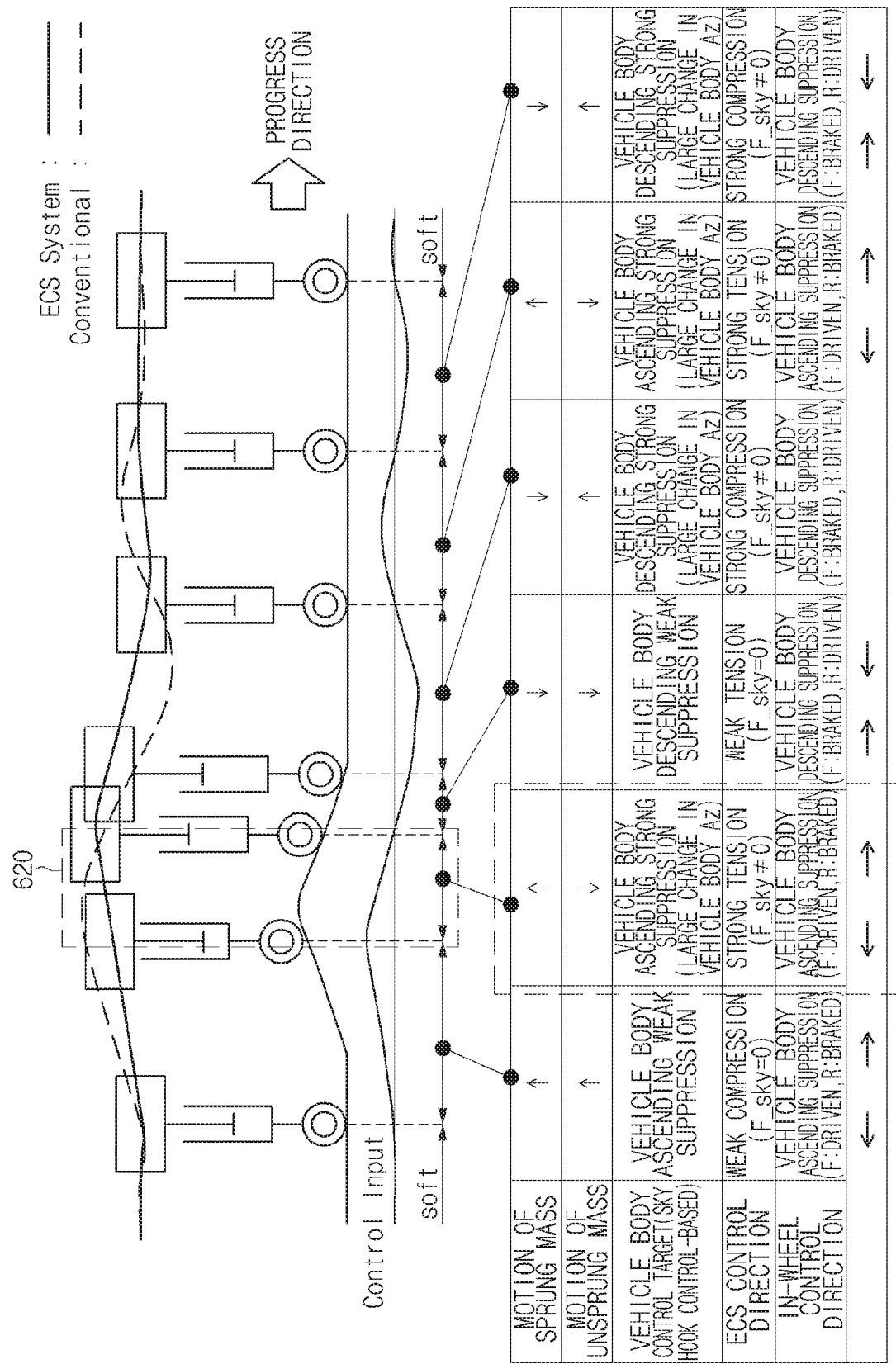
FIG. 6 is a view organizing a method for controlling an ECS and an in-wheel system for improving a riding quality in a vehicle integrated control system according to the embodiments of FIGS. 1 to 5 described above.

FIG. 6 is a view organizing a method for controlling an ECS and an in-wheel system for improving a riding quality in a vehicle integrated control system according to the embodiments of FIGS. 1 to 5 described above.

For example, referring to reference numerals 610 and 620, immediately after the vehicle has passed the uneven road surface, for example, a speed bump, the vehicle body ascends, and strong suppression of the ascending of the vehicle body may be required due to the ascending of the sprung mass and the descending of the unsprung mass. In this case, the ECS 10 may control the damping force such that the spring is in a strongly tensioned state, and the in-wheel system 20 may control the vertical component of force that controls front wheel in-wheel driving and rear wheel in-wheel braking such that the ascending of the vehicle body is suppressed.

FIG. 7 is a table showing motions 720 of the sprung and unsprung masses, ECS control 730, and control 740 of directions and magnitudes of an in-wheel vertical component of force based on the integrated control mode 710 in the vehicle integrated control system according to one embodiment of the present disclosure.

When the integrated control mode is the first mode, weak compression control using the basic damping force is performed as the ECS control, and a front-wheel in-wheel is driven and a rear-wheel in-wheel is braked to perform downward control on the in-wheel vertical component of force.

When the integrated control mode is the second mode, strong tension control using the basic damping force and the sky hook damping force is performed as the ECS control, and the front-wheel in-wheel is driven and the rear-wheel in-wheel is braked to perform the downward control on the in-wheel vertical component of force.

When the integrated control mode is the third mode, the weak tension control using the basic damping force is performed as the ECS control, and the front-wheel in-wheel is braked and the rear-wheel in-wheel is driven to perform upward control on the in-wheel vertical component of force.

When the integrated control mode is the fourth mode, the strong compression control using the basic damping force and the sky hook damping force is performed as the ECS control, and the front-wheel in-wheel is braked and the rear-wheel in-wheel is driven to perform the upward control on the in-wheel vertical component of force.

Figure 8:
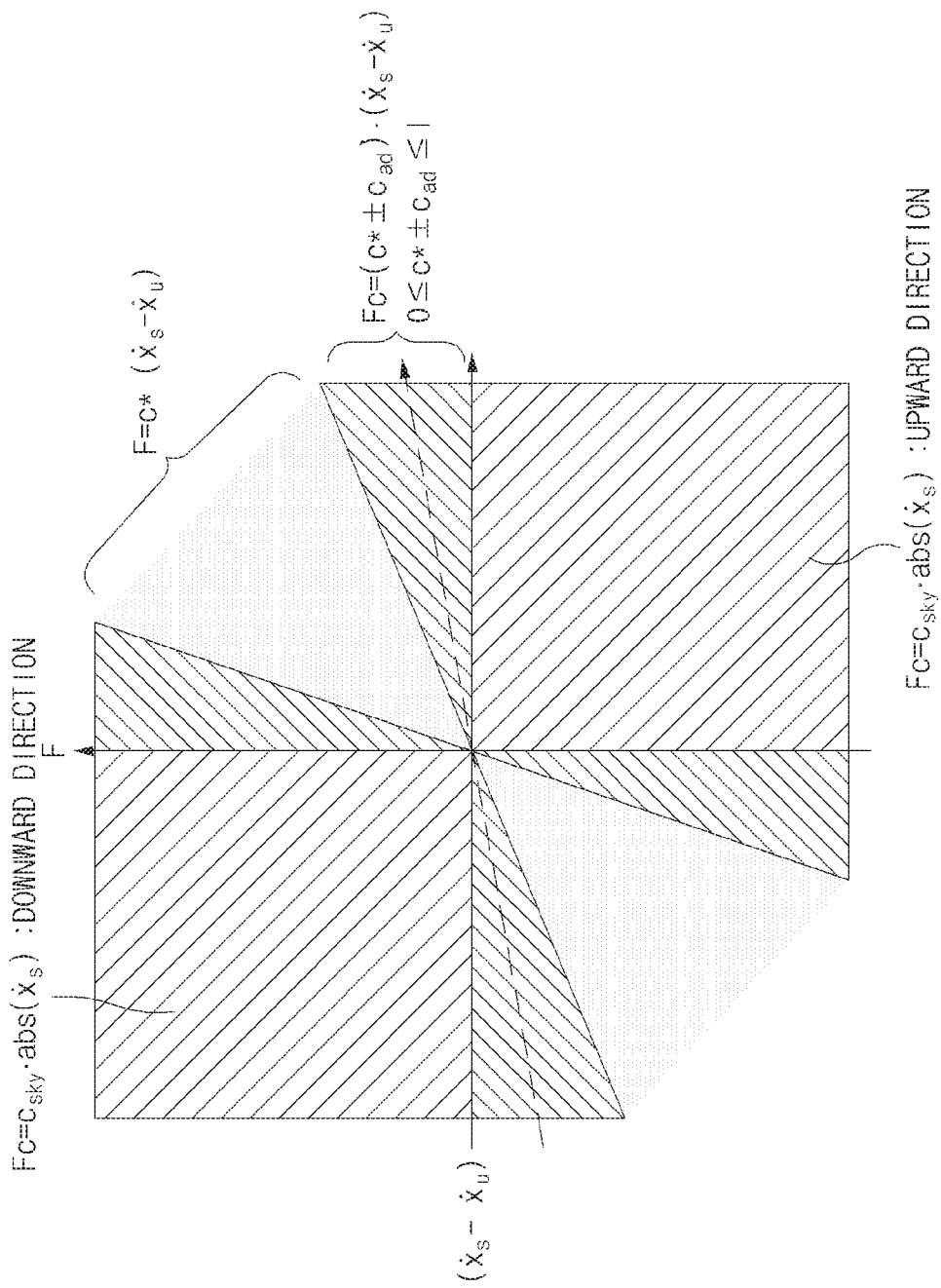
FIG. 8 is a schematic diagram of the table in FIG. 7.

FIG. 8 is a schematic diagram of the table in FIG. 7.

Referring to FIG. 8, because only the basic damping force acts in a ⅔ quadrant, the active damping force may be generated by creating a vertical component of force with the in-wheel system.

In a second quadrant where the vehicle body ascends and the spring compression occurs, the in-wheel system 20 may create a vertical component of force in a downward direction to improve the riding quality in a non-operating section of the ECS 10. In addition, in a fourth quadrant where the vehicle body descends and the spring tension occurs, the in-wheel system 20 may create a vertical component of force in an upward direction to improve the riding quality in the non-operating section of the ECS 10.

In ⅓ quadrants, the sky hook damping force acts. However, when a damping coefficient is equal to or below, or equal to or above, a certain damping coefficient, the sky hook damping force does not occur. Therefore, an adjusted damping coefficient $C_{ad}$ is applied. Thus, a vertical component of force corresponding to the adjusted damping coefficient $C_{ad}$ is generated using the in-wheel system 20 to improve the riding quality.

That is, when the integrated control mode is the second mode or the fourth mode, the sky hook damping force does not act in a region where the damping coefficient is equal to or below, or equal to or above the certain damping coefficient, so that the vertical component of force may be controlled by applying the adjusted damping coefficient.

Figure 9:
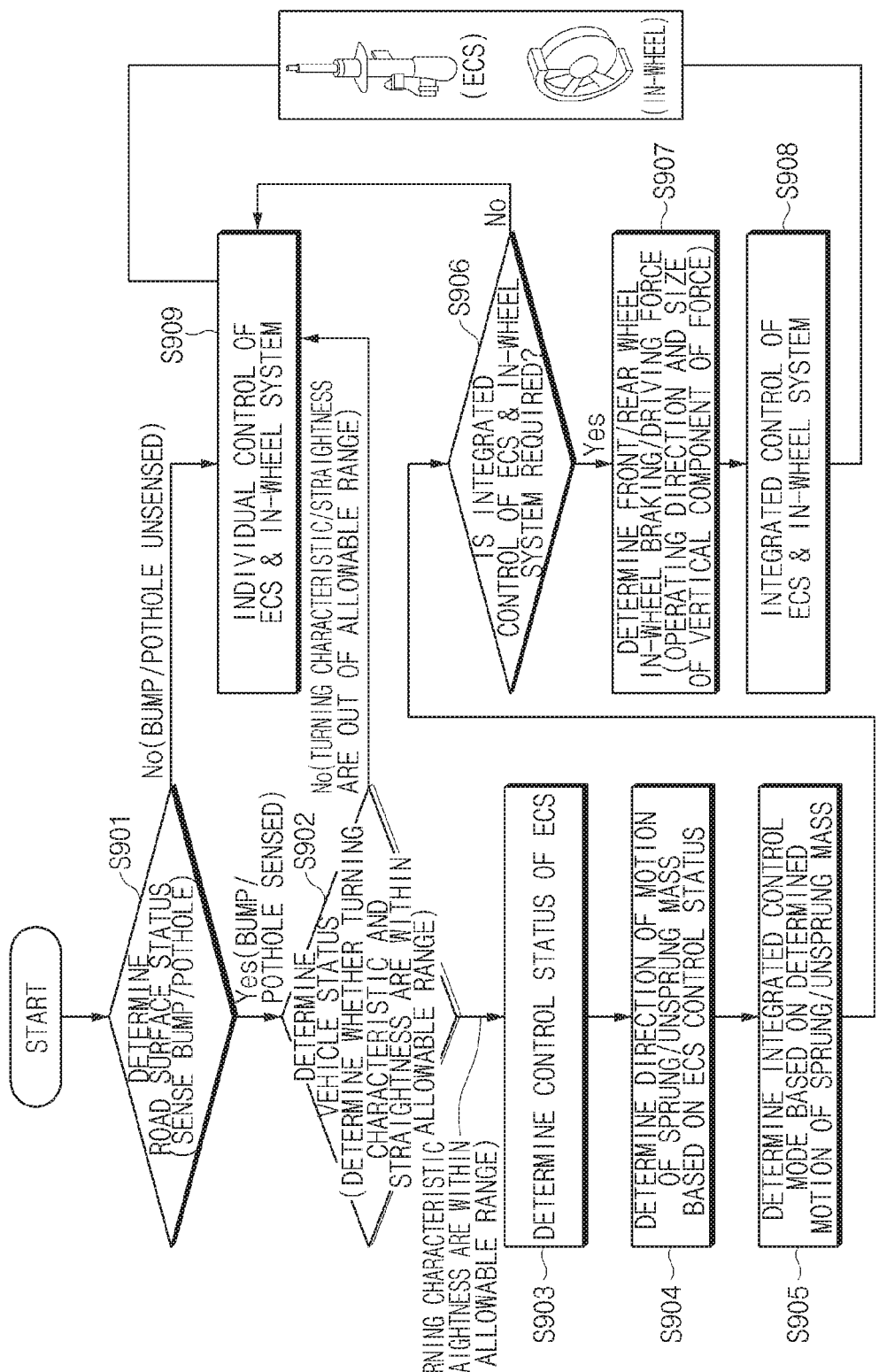
FIG. 9 is a flowchart illustrating a vehicle integrated control method for improving a riding quality according to one embodiment of the present disclosure.

FIG. 9 is a flowchart illustrating a vehicle integrated control method for improving a riding quality according to one embodiment of the present disclosure.

Referring to FIG. 9, the vehicle integrated control system 100 may determine the road surface status (S901).

The vehicle integrated control system 100 may determine the bump, the pothole, and the like based on the sensing information sensed by the various sensors arranged to sense the change in the vehicle body movement, the vehicle speed sensing signal, the camera-shot video, and the like.

When an irregular road surface or the uneven road surface such as the bump, the pothole, and the like is sensed as a result of determining the road surface status, the vehicle integrated control system 100 may determine the vehicle status (S902). In this connection, the vehicle status may include a turning status, but may not be limited thereto. The vehicle integrated control system 100 may determine whether a turning characteristic and a straightness are within a predetermined allowable range.

The vehicle integrated control system 100 may calculate the bounce, the roll, the pitch, and the yaw values of the vehicle using the vehicle body gravity sensor, the wheel gravity sensor, the lateral acceleration sensor (or the lateral G sensor) that senses the lateral acceleration of the vehicle during the traveling, the steering angle sensor that detects the rotation angle of the steering wheel, the vehicle speed sensor that detects the vehicle traveling speed, the yaw rate sensor that detects the rotational angular speed in the vertical axis direction, the tire pressure monitoring system (TPMS) that detects the tire pressure value, the acceleration/deceleration pedal sensor that detects the acceleration and deceleration pedal pressure values, and the like.

When the turning characteristic and the straightness are within the allowable range, the vehicle integrated control system 100 may determine a control status of the ECS 10 (S9o3). In this connection, the control status of the ECS 10 may be determined based on a damping force based on the ascending/descending of the vehicle body and a damping force based on the tension/compression of the spring. For example, the control status of the ECS 10 may be divided into a hard control region in which control of the active damping force by the ECS 10 is performed and a soft control region in which the ECS 10 is not operated.

The vehicle integrated control system 100 may determine a direction of the motion of the sprung/unsprung mass corresponding to the determined ECS control status (S904).

The vehicle integrated control system 100 may determine the integrated control mode based on the determined direction of the motion of the sprung/unsprung mass (S905).

The vehicle integrated control system 100 may determine whether integrated control of the ECS and the in-wheel system is required based on the determined integrated control mode (S906).

When the integrated control is required as a result of the determination, the vehicle integrated control system 100 may determine a front/rear-wheel in-wheel braking/driving force to be applied to the in-wheel system 20 (S907). In this connection, the operating direction and the magnitude of the vertical component of force may be determined based on the determined front/rear-wheel in-wheel braking/driving force.

The vehicle integrated control system 100 may perform the ECS and in-wheel integrated control based on the determined front/rear-wheel in-wheel braking/driving force (S908).

When the bump/pothole was not sensed in 901, when the turning characteristic/straightness is out of the allowable range in 902, or when it is determined in 906 that the integrated control of the ECS and the in-wheel system is not necessary, the vehicle integrated control system 100 may perform individual control of the ECS and the in-wheel system (S909).

Thus, the operations of the method or the algorithm described in connection with the embodiments disclosed herein may be embodied directly in a hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium is coupled to the processor, which may read information from, and write information to, the storage medium. In another method, the storage medium may be integral with the processor. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The embodiments of the present disclosure have an advantage of providing a vehicle integrated control method and system capable of improving the riding quality by integrally controlling the in-wheel system and the electronic control suspension (ECS).

In addition, embodiments of the present disclosure have an advantage of providing a vehicle integrated control method and system that independently control the braking force and the driving force of the in-wheel system to apply the vertical component of force of the vehicle body, so that a damping force of a vehicle with the semi active suspension is actively controlled like that of a vehicle with the full active suspension, thereby optimizing the riding quality.

In addition, embodiments of the present disclosure have an advantage of providing a vehicle integrated control method and system capable of satisfying the riding quality without changing an ESC capacity due to vehicle weight increase.

In addition, embodiments of the present disclosure may not only reduce cost required to improve the riding quality through the integrated control of the in-wheel system and the ECS, but also may expect a communication effect.

In addition, various effects that may be directly or indirectly identified through the embodiments of the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle integrated control method, the method comprising:
   determining a road surface status;
   determining a vehicle status;
   determining an integrated control mode by determining a control status of an electronic control suspension and a motion of a sprung mass and an unsprung mass based on the determination results of the road surface status and the vehicle status; and
   controlling the electronic control suspension and an in-wheel system by determining a control amount based on the determined integrated control mode,
   wherein determining the integrated control mode comprises:
   determining the integrated control mode as a first mode when both the sprung mass and the unsprung mass ascend based on ascending of a vehicle body and compression of a spring;
   determining the integrated control mode as a second mode when the sprung mass ascends and the unsprung mass descends based on the ascending of the vehicle body and tension of the spring;
   determining the integrated control mode as a third mode when both the sprung mass and the unsprung mass descend based on descending of the vehicle body and the tension of the spring; and
   determining the integrated control mode as a fourth mode when the sprung mass descends and the unsprung mass ascends based on the descending of the vehicle body and the compression of the spring.

2. The method of claim 1, wherein the vehicle status is determined when the road surface status is an irregular road surface including a bump or a pothole.

3. The method of claim 1, wherein determining the vehicle status comprises:
   determining whether a turning characteristic and a straightness are within a predetermined allowable range,
   wherein the control status of the electronic control suspension and the motion of the sprung mass and the unsprung mass are determined when the turning characteristic and the straightness are within the predetermined allowable range.

4. The method of claim 1, wherein a basic damping force of the electronic control suspension and a vertical component of force of the in-wheel system are controlled in the first mode and the third mode.

5. The method of claim 4, wherein:
   a direction and a magnitude of the vertical component of force are controlled based on a braking force and a driving force of a front-wheel in-wheel and a rear-wheel in-wheel;
   the front-wheel in-wheel is driven and the rear-wheel in-wheel is braked in the first mode to control the vertical component of force in a downward direction; and the front-wheel in-wheel is braked and the rear-wheel in-wheel is driven in the third mode to control the vertical component of force in an upward direction.

6. The method of claim 1, wherein a basic damping force and a sky hook damping force of the electronic control suspension are controlled and a vertical component of force of the in-wheel system is controlled in the second mode and the fourth mode.

7. The method of claim 6, wherein:
a direction and a magnitude of the vertical component of force are controlled based on a braking/driving force of a front/rear-wheel in-wheel;
the front-wheel in-wheel is driven and the rear-wheel in-wheel is braked in the second mode to control the vertical component of force in a downward direction; and
the front-wheel in-wheel is braked and the rear-wheel in-wheel is driven in the fourth mode to control the vertical component of force in an upward direction.

8. The method of claim 7, wherein the vertical component of force is controlled by applying an adjusted damping coefficient in a region where a damping coefficient is equal to or below, or equal to or above, a certain damping coefficient in the second mode or the fourth mode.

9. The method of claim 1, wherein the road surface status is determined using a G-value level and a vibration frequency based on sensing values measured by a vehicle body gravity sensor and a wheel gravity sensor.

10. A vehicle integrated control system for improving a riding quality using an electronic control suspension and an in-wheel system, the vehicle integrated control system comprising:
a road surface status determination module configured to determine a road surface status;
a vehicle status determination module configured to determine a vehicle status;
an integrated control mode determination module configured to determine an integrated control mode by determining a control status of the electronic control suspension and a motion of a sprung mass and an unsprung mass based on the determination results of the road surface status and the vehicle status;
a control amount determination module configured to determine a control amount based on the determined integrated control mode;
a first control module configured to control the electronic control suspension based on the determined control amount; and
a second control module configured to control the in-wheel system based on the determined control amount,
wherein the integrated control mode determination module is configured to:
determine the integrated control mode as a first mode when both the sprung mass and the unsprung mass ascend based on ascending of a vehicle body and compression of a spring;
determine the integrated control mode as a second mode when the sprung mass ascends and the unsprung mass descends based on the ascending of the vehicle body and tension of the spring;
determine the integrated control mode as a third mode when both the sprung mass and the unsprung mass descend based on descending of the vehicle body and the tension of the spring; and
determine the integrated control mode as a fourth mode when the sprung mass descends and the unsprung mass ascends based on the descending of the vehicle body and the compression of the spring.

11. The vehicle integrated control system of claim 10, wherein the vehicle status determination module is configured to determine the vehicle status when the road surface status is an irregular road surface including a bump or a pothole.

12. The vehicle integrated control system of claim 10, wherein the vehicle status determination module is configured to:
determine whether a turning characteristic and a straightness are within a predetermined allowable range; and
determine the control status of the electronic control suspension and the motion of the sprung mass and the unsprung mass when the turning characteristic and the straightness are within the predetermined allowable range.

13. The vehicle integrated control system of claim 10, wherein a basic damping force of the electronic control suspension and a vertical component of force of the in-wheel system are controlled in the first mode and the third mode.

14. The vehicle integrated control system of claim 13, wherein:
a direction and a magnitude of the vertical component of force are controlled based on a braking force and a driving force of a front-wheel in-wheel and a rear-wheel in-wheel; and
the second control module is configured to:
drive the front-wheel in-wheel and brake the rear-wheel in-wheel in the first mode to control the vertical component of force in a downward direction; and
brake the front-wheel in-wheel and drive the rear-wheel in-wheel in the third mode to control the vertical component of force in an upward direction.

15. The vehicle integrated control system of claim 10, wherein a basic damping force and a sky hook damping force of the electronic control suspension are controlled and a vertical component of force of the in-wheel system is controlled in the second mode and the fourth mode.

16. The vehicle integrated control system of claim 15, wherein:
a direction and a magnitude of the vertical component of force are controlled based on a braking/driving force of a front/rear-wheel in-wheel; and
wherein the second control module is configured to:
drive the front-wheel in-wheel and brake the rear-wheel in-wheel in the second mode to control the vertical component of force in a downward direction; and
brake the front-wheel in-wheel and drive the rear-wheel in-wheel in the fourth mode to control the vertical component of force in an upward direction.

17. The vehicle integrated control system of claim 16, wherein the vertical component of force is controlled by applying an adjusted damping coefficient in a region where a damping coefficient is equal to or below, or equal to or above, a certain damping coefficient in the second mode or the fourth mode.

18. The vehicle integrated control system of claim 10, wherein the road surface status determination module is configured to determine the road surface status using a G-value level and a vibration frequency based on sensing values measured by a vehicle body gravity sensor and a wheel gravity sensor.

19. A vehicle integrated control method, the method comprising:
determining a road surface status;
determining a vehicle status;

determining an integrated control mode by determining a control status of an electronic control suspension and a motion of a sprung mass and an unsprung mass based on the determination results of the road surface status and the vehicle status; and controlling the electronic control suspension and an in-wheel system by determining a control amount based on the determined integrated control mode, wherein determining the integrated control mode comprises:
- determining the integrated control mode as a first mode when both the sprung mass and the unsprung mass ascend based on ascending of a vehicle body and compression of a spring;
- determining the integrated control mode as a second mode when the sprung mass ascends and the unsprung mass descends based on the ascending of the vehicle body and tension of the spring;
- determining the integrated control mode as a third mode when both the sprung mass and the unsprung mass descend based on descending of the vehicle body and the tension of the spring; and
- determining the integrated control mode as a fourth mode when the sprung mass descends and the unsprung mass ascends based on the descending of the vehicle body and the compression of the spring;

wherein a basic damping force of the electronic control suspension and a vertical component of force of the in-wheel system are controlled in the first mode and the third mode; and wherein the basic damping force, a sky hook damping force of the electronic control suspension, and the vertical component of force of the in-wheel system are controlled in the second mode and the fourth mode.

20. The method of claim 19, wherein:
- a direction and a magnitude of the vertical component of force are controlled based on a braking/driving force of a front/rear-wheel in-wheel;
- the front-wheel in-wheel is driven and the rear-wheel in-wheel is braked in the second mode to control the vertical component of force in a downward direction;
- the front-wheel in-wheel is braked and the rear-wheel in-wheel is driven in the fourth mode to control the vertical component of force in an upward direction; and
- the vertical component of force is controlled by applying an adjusted damping coefficient in a region where a damping coefficient is equal to or below, or equal to or above, a certain damping coefficient in the second mode or the fourth mode.

* * * * *